(12) United States Patent
Karuppiah

(10) Patent No.: US 7,280,752 B2
(45) Date of Patent: Oct. 9, 2007

(54) NETWORK ADDRESS ROUTING USING MULTIPLE ROUTING IDENTIFIERS

(75) Inventor: Ettikan K. Karuppiah, Klang Selangor (MY)

(73) Assignee: Intel Corporation, Santa Clara, CA (US)

( * ) Notice: Subject to any disclaimer, the term of this patent is extended or adjusted under 35 U.S.C. 154(b) by 996 days.

(21) Appl. No.: 10/081,055

(22) Filed: Feb. 22, 2002

(65) Prior Publication Data

US 2003/0161309 A1     Aug. 28, 2003

(51) Int. Cl.
*H04J 1/16* (2006.01)
(52) U.S. Cl. .................. 396/238; 370/392; 709/241
(58) Field of Classification Search ........... 370/238, 370/389, 357, 352–356, 400, 401, 237, 252, 370/397, 392, 399; 709/238–242; 455/414.1
See application file for complete search history.

(56) References Cited

U.S. PATENT DOCUMENTS

| | | | |
|---|---|---|---|
| 5,539,739 A | | 7/1996 | Dike et al. |
| 5,546,596 A | | 8/1996 | Geist |
| 5,570,466 A | * | 10/1996 | Oechsle ................. 709/238 |
| 5,598,408 A | * | 1/1997 | Nickolls et al. ........... 370/351 |
| 6,091,725 A | * | 7/2000 | Cheriton et al. ........... 370/392 |
| 6,272,629 B1 | | 8/2001 | Stewart |
| 6,307,789 B1 | | 10/2001 | Wolrich et al. |
| 6,308,220 B1 | * | 10/2001 | Mathur ................. 709/238 |
| 6,324,624 B1 | | 11/2001 | Wolrich et al. |
| 6,550,001 B1 | * | 4/2003 | Corwin et al. ............ 712/216 |
| 6,934,534 B1 | * | 8/2005 | Roy ................. 455/414.1 |

OTHER PUBLICATIONS

Heikki Waris, "Ipv6 Tutorial," Power Point Presentation, Nokia 2001.
V. Fuller et al, "Classless Inter-Domain Routing (CIDR): an Address Assignment and Aggregation Strategy," http://ietf.org/rfc/rfc1519.txt?number=1519; Network Working Group, Sep. 1993.
R. Hinden et al, "An Ipv6 Aggregatable Global Unicast Address Format," http://www.cis.ohio-state.edu/cgi-bin/rfc/rfc2374.html, Network Working Group, Jul. 1998.
R. Hinden et al, "IP Version 6 Addressing Architecture," draft-ietf-ipngwg-addr-arch-v3-05txt, Internet Draft, Mar. 2001.
R. Hinden et al, "IP Version 6 Addressing Architecture," draft-ietf-ipngwg-addr-arch-v3-06.txt, Internet Draft, Jul. 2001.

(Continued)

*Primary Examiner*—John Pezzlo
(74) *Attorney, Agent, or Firm*—Fish & Richardson P.C.

(57) ABSTRACT

Network address routing systems and techniques enable multiple lookup techniques and multiple data structures to be used in identifying a next-hop route for a single destination address. Various subparts of a destination address are examined separately to determine a set of route identification operations to be performed, and a routing matrix may be built. The separate examination of the subparts of the destination address may involve performing an EXCLUSIVE OR operation on multiple routing identifiers from a source and a destination address in a packet. Parallel processing may be used, such as by using multiple hardware threads in multiple programming engines in a hardware-based multithreaded processor. The determined set of route identification operations may include different lookup techniques and may employ different data structures.

24 Claims, 9 Drawing Sheets

OTHER PUBLICATIONS

S. Deering, "Internet Protocol, Version 6 (Ipv6) Specification," http://ietf.org/rfc/rfc2460.txt?number=2460 ; Network Working Group, Dec. 1998.

R. Hinden et al, "IP Version 6 Addressing Architecture," http://ietf.org/rfc/rfc2373.txt?number=2373, Network Working Group, Jul. 1998.

* cited by examiner

FIG. 3A

| Routing Matrix | Routing ID One | Routing ID Two | ... |
|---|---|---|---|
| To be used? | TRUE/FALSE | TRUE/FALSE | ... |
| ... | ... | ... | ... |

FIG. 3B

| Host | SLA | NLA | TLA |
|---|---|---|---|
| 64-127 | 48-63 | 24-47 | 2-15 |

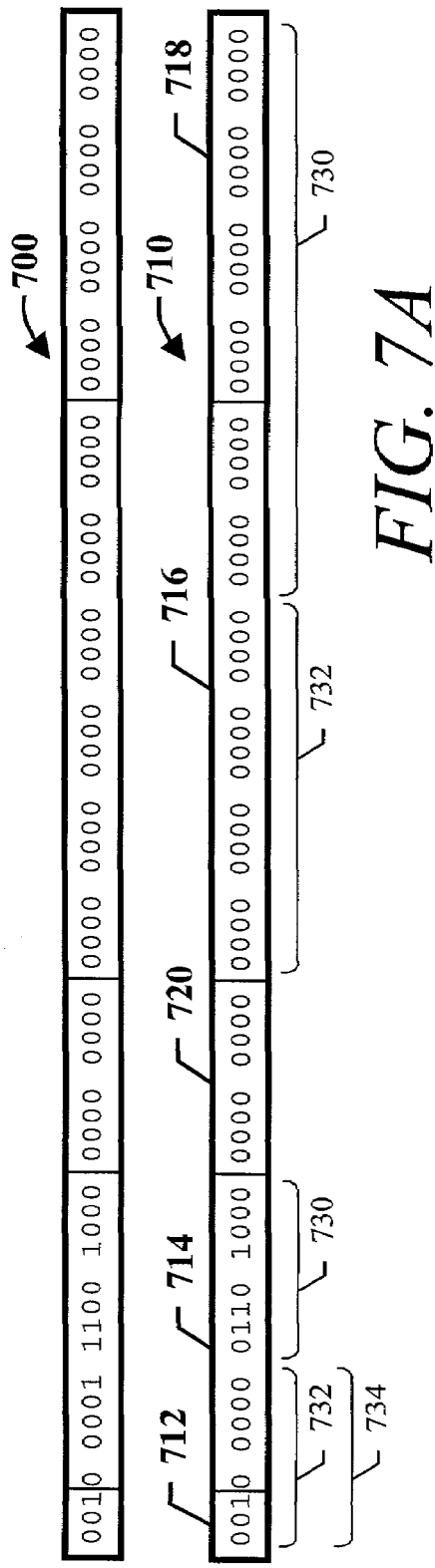
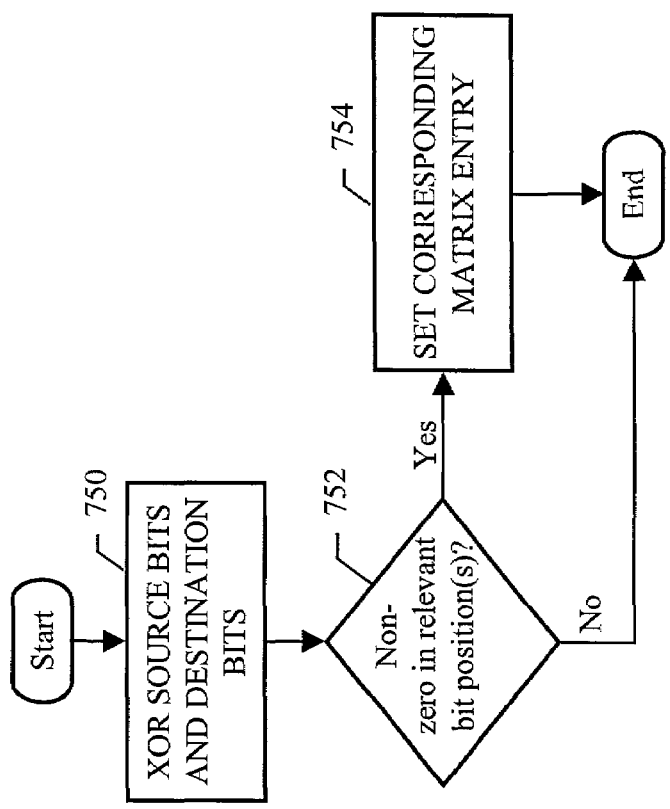
FIG. 7A
FIG. 7B

NETWORK ADDRESS ROUTING USING MULTIPLE ROUTING IDENTIFIERS

BACKGROUND

The present application describes systems and techniques relating to network address routing using multiple routing identifiers.

A machine network is a collection of nodes coupled together with wired and/or wireless communication links, such as coax cable, fiber optics and radio frequency bands. A machine network may be a single network or a collection of networks, and may use multiple networking protocols, including an inter-networking protocol (e.g., the Internet Protocol (IP)). A node may be any machine capable of communicating with other nodes over the communication links using one or more of the networking protocols.

Many machine networks use packet switching, in which data to be sent over the network is first broken up into segments known as packets, and each packet is handled separately. Each packet typically includes a header with routing information such as a source address and a destination address. These addresses are frequently unicast addresses, which identify a specific destination node.

As packets travel through a network, they may be encapsulated within other packets one or more times. Encapsulation of packets enables data to travel from a source node to a final destination node through multiple networks, which may use different protocols and addressing schemes, without the two end nodes knowing anything about the intermediate addressing schemes and protocols.

Inter-networking addressing schemes typically are based on a network identifier and a node identifier, which together make up an address. For example, traditional IP addressing includes a network number and a host (node) number in each address. This allows routing of packets through a network based upon a destination network as well as a destination node.

Typically, packets are routed through a network using lookup tables stored in random access memory (RAM), such as Static Random Access Memory (SRAM). As each packet is received, its destination address is processed using a lookup table to identify a next-hop route. In IP, routing of packets also typically includes determining whether a destination address is a non-forwarding address and determining an address class for a destination address. Address classes are used, for example in IP, to identify the length of a network number within an address. The network number may identify a group of nodes on one or more networks that are administered together, typically with common rules and procedures (i.e., a domain).

Traditional IP routers route packets according to network class and network number. Due to limits imposed by IP network class routing, Classless Inter-Domain Routing (CIDR) techniques have been developed to allow aggregation of Class C IP addresses (i.e., supernetting). In traditional CIDR, routing is performed according to an address prefix defined by a network mask, and a longest-match-is-best approach is used. Effectively, variable portions of a network number may be used in routing, thereby identifying variable portions of one or more networks.

By assigning addresses (e.g., Class C addresses) to follow network topology (e.g., provider-based aggregation and geographical-based aggregation), CIDR enables efficient use of an address space and may minimize routing table entries. Moreover, techniques similar to CIDR also may be used to break down a Class A or B address (i.e., subnetting) to help preserve address space.

DRAWING DESCRIPTIONS

FIG. 3A is a block diagram illustrating a routing matrix.

FIG. 3B is a block diagram illustrating an example IP routing matrix.

FIG. 7A is a block diagram illustrating portions of example source and destination aggregatable global unicast addresses for an IP packet.

FIG. 7B is a flow chart illustrating a method of building a routing matrix using an EXCLUSIVE OR operation.

Details of one or more embodiments are set forth in the accompanying drawings and the description below. Other features and advantages may be apparent from the description and drawings, and from the claims.

DETAILED DESCRIPTION

The systems and techniques described here relate to network address routing using multiple routing identifiers. The description that follows discusses packet handling in the context of IP, but may apply equally in other contexts, for example to any networking protocol that allows routing of data based upon one or more of two or more defined subparts of a destination address.

In the next generation of IP (IP version 6), each address will be 128 bits long, instead of the traditional 32 bits. This increase in address length will result in an increase in processing required to resolve an address, and thus likely will create a performance bottleneck for network address routing. The present inventor recognized that a strictly hardware-based solution to this performance bottleneck would tend to lack versatility. Accordingly, the inventor developed network address routing systems and techniques that, among other advantages, enable quick routing of packets in a large address space using a flexible software implementation. These systems and techniques will remain useful and advantageous as the next generation of IP changes and matures over time and/or if other software and/or hardware portions of a router are changed.

As a result of using these systems and techniques, multiple lookup techniques and multiple data structures may be used in identifying a next-hop route for a single destination address. Various subparts of a destination address may be examined separately to determine a set of route identification operations to be performed, and a routing matrix may be built.

The set of route identification operations may include different lookup techniques and may employ different data structures. By combining various lookup techniques to identify a next-hop route, performance advantages may be realized. Moreover, by using parallel processing with the systems and techniques of the present application, additional performance advantages may be realized.

Figure 1A:
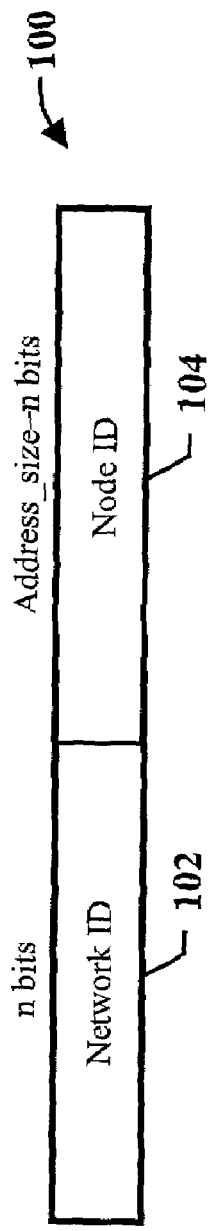
FIG. 1A is a block diagram illustrating a traditional address format for an inter-networking protocol.

FIG. 1A is a block diagram illustrating a traditional address format for an inter-networking protocol. A unicast address 100 includes a network identifier 102 and a node identifier 104. The network identifier 102, which may be assigned different lengths within the address 100 (i.e., n bits, making the node identifier 104 address_size-n bits), represents a routing identifier for use in routing packets. By using a subset of an address for routing (e.g., routing based on a destination network), routing speeds may be increased and routing table sizes may be minimized.

Figure 1B:
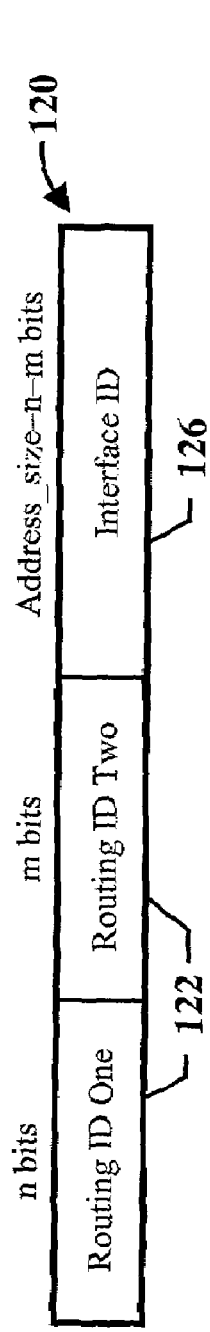
FIG. 1B is a block diagram illustrating an alternative address format for an inter-networking protocol.

FIG. 1B is a block diagram illustrating an alternative address format for an inter-networking protocol. In contrast to traditional address formats, a unicast address 120 includes two or more routing identifiers 122 and an interface identifier 126. The routing identifiers 122 may each be assigned different lengths within the address 120 (i.e., n bits and m bits, making the interface identifier 126 address_size-n-m bits) and may correspond to networks or other network topology aspects that may be used in routing data.

For each packet of data, one or more of the two or more routing identifiers 122 may be used for routing data, either separately or together. By using two or more subsets of an address for routing, routing speeds may be increased and routing table sizes may be minimized in large address spaces. In addition, new flexibilities in data routing, address assignments and network reconfigurations become possible—e.g., organizations may obtain addressing independence from long-haul network service providers and may be easily multihomed via an exchange to more than one long-haul provider.

The interface identifier 126 identifies a particular interface on a node, as opposed to the node itself. Thus, a node may have multiple associated interface identifiers.

The alternative address format of FIG. 1B may be used with the next generation of IP (IPv6). IPv6 is being defined by the IETF (Internet Engineering Task Force) and, based on current definitions, will include 128 bit unicast addresses in its addressing architecture. IPv6 unicast addresses will be aggregatable with continuous bit-wise masks similar to the current generation IP addressing using CIDR.

Figure 1C:
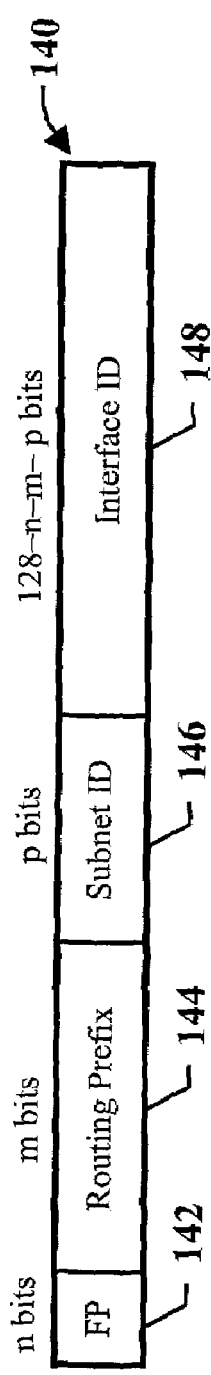
FIG. 1C is a block diagram illustrating an example global unicast address format for IP.

FIG. 1C is a block diagram illustrating an example global unicast address format for IP. Global unicast addresses in IPv6 may include a format prefix (FP) 142 in an address 140. The FP 142 identifies a format for a routing prefix 144, a subnet identifier (ID) 146 and an interface ID 148. The routing prefix 144 and the subnet ID 146 represent routing identifiers as described above. The FP 142, routing prefix 144 and the subnet ID 146 may each be assigned different lengths within the address 140 (i.e., n bits, m bits and p bits, respectively, making the interface ID 148 128-n-m-p bits).

The interface ID 148 may be a 64-bit field in EUI-64™ format. The EUI-64™ format is an IEEE (Institute of Electrical and Electronics Engineers) defined 64-bit extended unique identifier, which is a concatenation of a 24-bit company ID (assigned by IEEE) and a 40-bit extension identifier (assigned by the organization with the particular company ID).

Figure 1D:
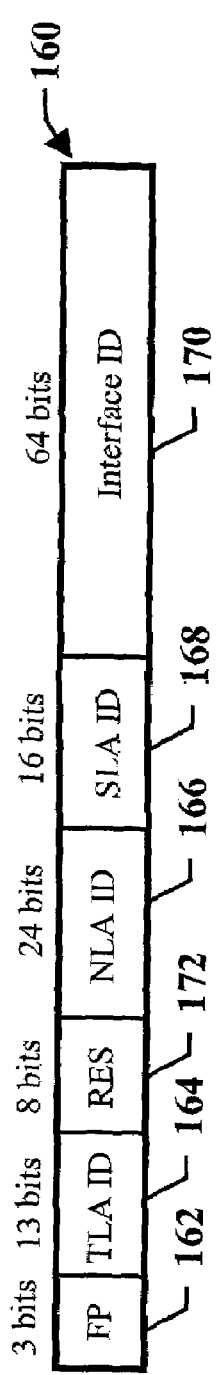
FIG. 1D is a block diagram illustrating an example aggregatable global unicast address format for IP.

FIG. 1D is a block diagram illustrating an example aggregatable global unicast address format for IP. The aggregatable global unicast address format for an IPv6 address 160 may be identified by an FP 162, which may be 3 bits long and set to the binary value 001. The IPv6 address 160 may include a top-level aggregation identifier (TLA ID) 164, a next-level aggregation identifier (NLA ID) 166, a site-level aggregation identifier 168 (SLA ID) and an interface ID 170. The IPv6 address 160 also may include a reserved field 172, which is reserved for future use.

The IPv6 address 160 has three different routing identifiers, the top-level aggregation ID 164, the next-level aggregation ID 166 and the site-level aggregation ID 168. These routing identifiers may be used individually or together when routing data through a network. This addressing format may support exchange-based aggregation as well as provider-based aggregation, either simultaneously or separately.

The TLA ID 164 and the NLA ID 166 make up a public topology portion of the IPv6 address 160. This public topology portion may be used by providers and exchanges who provide public Internet transit services. The TLA ID 164 may be 13 bits long and may be used by backbone routers (i.e., the main routers or core routers in a network of networks) to look up addresses for forwarding data through a network backbone (e.g., long-haul providers). The NLA ID 166 may be 24 bits long and may be used at intermediate routers in a network.

The SLA ID 168 makes up a site topology portion of the IPv6 address 160. This site topology portion may be used by specific sites or organizations that do not provide public transit service to nodes outside of the site/organization. The SLA ID 168 may be 16 bits long and may be used by all routers regardless of their level in a network hierarchy.

The interface ID 170 may be a 64-bit field in EUI-64™ format and identifies an interface on a link. The reserved field 172 may be an 8-bit field set to all zeroes and is reserved for future use, such as expansion of the TLA ID 164 and/or the NLA ID 166. For additional details on the IPv6 addressing architecture, see Request for Comments (RFC) 2373 and RFC 2374.

Figure 2:
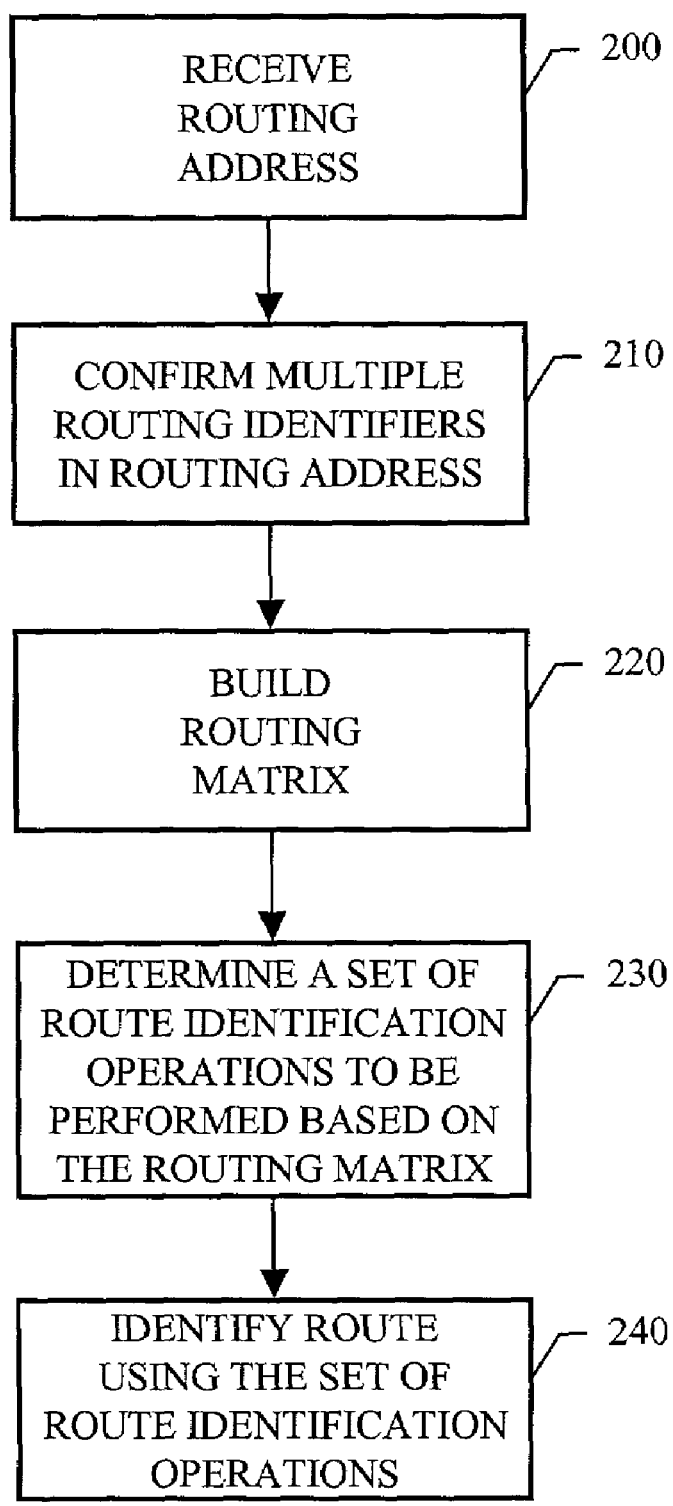
FIG. 2 is a flow chart illustrating a method of routing data in a network using a routing matrix.

FIG. 2 is a flow chart illustrating a method of routing data in a network using a routing matrix. The method begins when a routing address is received (200). For example, a data packet may be received and a destination address may be extracted. The routing address may include the destination address, may be the destination address or may be a portion of the destination address. The packet may be an IP packet with an IP header.

Next, the routing address is confirmed to include multiple routing identifiers (210). For example, a format prefix in a destination address may be checked to identify the format of the routing address. In an IPv6 router, the initial 3 bits of the destination address may be checked for the sequence 001 to confirm that the destination address is a global unicast address.

Then, a routing matrix for the routing identifier is built (220). The routing matrix has multiple entries that are set based upon two or more routing identifiers in the routing address. These entries identify one or more routing features for the routing address. For example, the routing address may have two routing identifiers, either or both of which may be used for routing the packet. If a routing identifier in the routing address is to be used in routing the packet, a corresponding entry is assigned an appropriate value in the routing matrix.

Once the routing matrix has been built, a set of route identification operations to be performed may be determined based on the routing matrix (230). For example, in the two routing identifiers example discussed above, three different types of routing are possible: (1) route the packet based on the first routing identifier, (2) route the packet based on the second routing identifier, and (3) route the packet based on both the first and the second routing identifiers.

Thus, three or more sets of route identification operations are possible. The route identification operations may include direct route lookup, such as in a single route table, longest-prefix-match lookup, such as in a set of route tables, hash table lookup, N-tuple lookup methods (where tuple refers to how many fields are being used to break up a long address field and perform lookup for it, where N may be 2, 3, 4, 5, etc.), other lookup techniques, or combinations of these.

For example, if the routing address has two routing identifiers, and both are to be used in routing the packet, deciding the route may involve two different route lookup operations (e.g., a direct lookup and a longest-prefix-match lookup). By tailoring route lookup operations to respective route identifiers, performance may be enhanced.

After the set of route identification operations to be performed has been determined, a route is identified by performing the route identification operations in the set (240). The route identified may be a next-hop for the packet. Moreover, when the set includes multiple route identification operations (e.g., a direct lookup on a first routing identifier and a longest-prefix match on a second routing identifier), and these operations return different routes, both returned routes may be used simultaneously, the two routes may be compared to identify which is better given current network conditions (e.g., routes may have associated weights or selection levels that are used to determine a current optimum path given network condition), a route harmonization method may be employed, and/or the first route to be identified may be used.

FIG. 3A is a block diagram illustrating a routing matrix 300. The routing matrix 300 includes two columns 305, 310 for routing identifiers, and may include additional columns 315 for additional routing identifiers. The routing matrix 300 includes a row 320 that identifies which routing identifiers are to be used for routing a packet. The row 320 stores Boolean TRUE/FALSE values. Additional rows 325 also may be included in the routing matrix 300. These additional rows 325 may store additional information concerning the routing identifiers and how they are to be used during routing a packet. This additional information also may be stored as Boolean TRUE/FALSE values. When all the elements of the routing matrix are Boolean TRUE/FALSE values, the routing matrix may be stored as a bit map, for example, as a single binary number.

FIG. 3B is a block diagram illustrating an example IP routing matrix 350. The IP routing matrix 350 includes a single row 355 and may be used for global unicast address routing. The IP routing matrix 350 may be stored as a nibble (i.e., four bits of data), as larger binary numbers, and/or other number and/or character representations.

Host-level routing may or may not be implemented in a router depending upon the router's location in a network and the underlying router hardware. When host-level routing is implemented, if an interface ID for a destination address is to be used in routing, a Host column 360 is set to TRUE. For example, if there is a difference between the source address and the destination address in bit positions 64-127, then the highest order bit of a routing matrix nibble is set to one.

If an SLA ID for the destination address is to be used in routing, an SLA column 365 is set to TRUE. For example, if a difference exists between the source address and the destination address in bit positions 48-63, then the second highest order bit of the nibble is set to one.

If an NLA ID for the destination address is to be used in routing, an NLA column 370 is set to TRUE. For example, if a difference exists between the source address and the destination address in bit positions 24-47, then the third highest order bit of the nibble is set to one. If a TLA ID for the destination address is to be used in routing, a TLA column 375 is set to TRUE. For example, if there is a difference between the source address and the destination address in bit positions 3-15, then the fourth highest order bit of the nibble is set to one.

The IP routing matrix 350 described above also may be used for global unicast address routing without supporting host-level routing. In this case, only the routing identifiers (TLA, NLA and SLA) are used. This may provide performance advantages for routers that need not support host-level routing.

In addition, other bit positions and values may be used in the routing matrix 350. For example, the bit positions may be reversed so the highest order bit corresponds to the TLA ID and the lowest order bit corresponds to the interface ID, and/or the values may be inverted so that a zero represents TRUE and a one represents FALSE. Alternate bit positions and values may be used to provide potential performance advantages during checking of the routing matrix in various routing environments, and as mentioned above, larger binary numbers may be used. For example, the NLA ID and/or the SLA ID may be broken into sub-fields, each getting their own entry in the routing matrix, for better address aggregation, delegation and management.

Figure 4A:
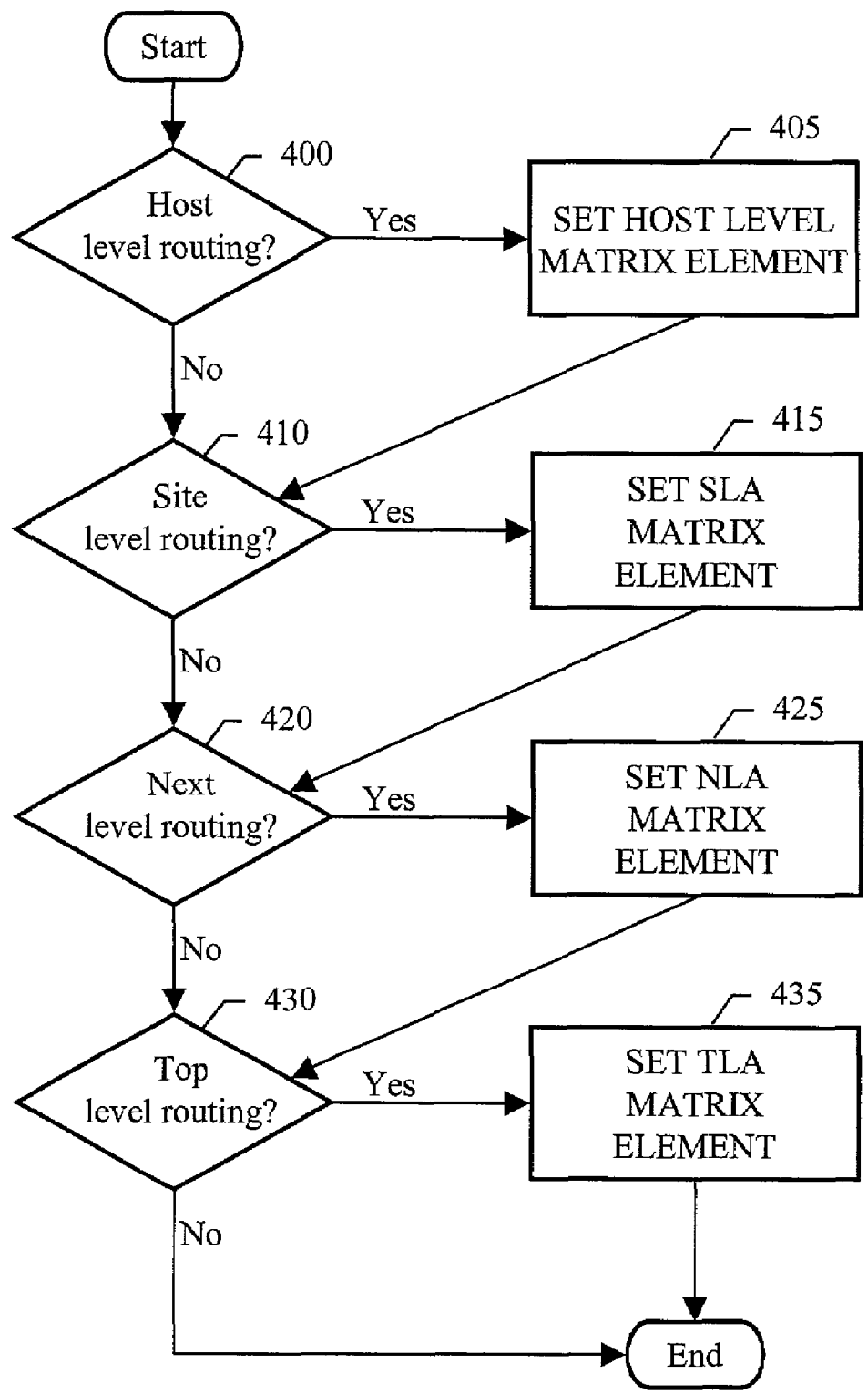
FIG. 4A is a flow chart illustrating a method of building a routing matrix in an IP router.

FIG. 4A is a flow chart illustrating a method of building a routing matrix in an IP router. The method builds a matrix for global unicast address routing. The method begins by checking whether host-level routing is to be used with a packet (400). A source and destination address may be compared to determine if a difference exists between interface ID portions of the addresses. If host-level routing is to be performed, then a host-level matrix element in the routing matrix is set (405).

After this, or if host-level routing is not to be used for a current packet, then a check is made to determine whether site-level routing is to be performed (410). A source and destination address may be compared to determine if the SLA ID portions of the addresses differ. If site-level routing is to be performed, then an SLA matrix element in the routing matrix is set (415).

After this, or if site-level routing is not to be used, then a check is made to determine whether next-level routing is to be performed (420). For example, a source and destination address may be compared to determine if there is a difference in NLA ID portions of the addresses. If next-level routing is to be performed, then an NLA matrix element in the routing matrix is set (425).

After this, or if next-level routing is not to be used, then a check is made to determine whether top-level routing is to be performed (430). For example, a source and destination address may be compared to determine if there is a difference in TLA ID portions of the addresses. If top-level routing is to be performed, then a TLA matrix element in the routing matrix is set (435). After this, or if top-level routing is not to be used, the process ends.

The comparisons between source and destination addresses may be performed using an EXCLUSIVE OR operation, as discussed further below in connection with FIGS. 7A and 7B. Additionally, as mentioned above, host-level routing need not be supported. Thus, an interface ID portion of a destination address need not be checked, and the host level matrix element need not be used.

Figure 4B:
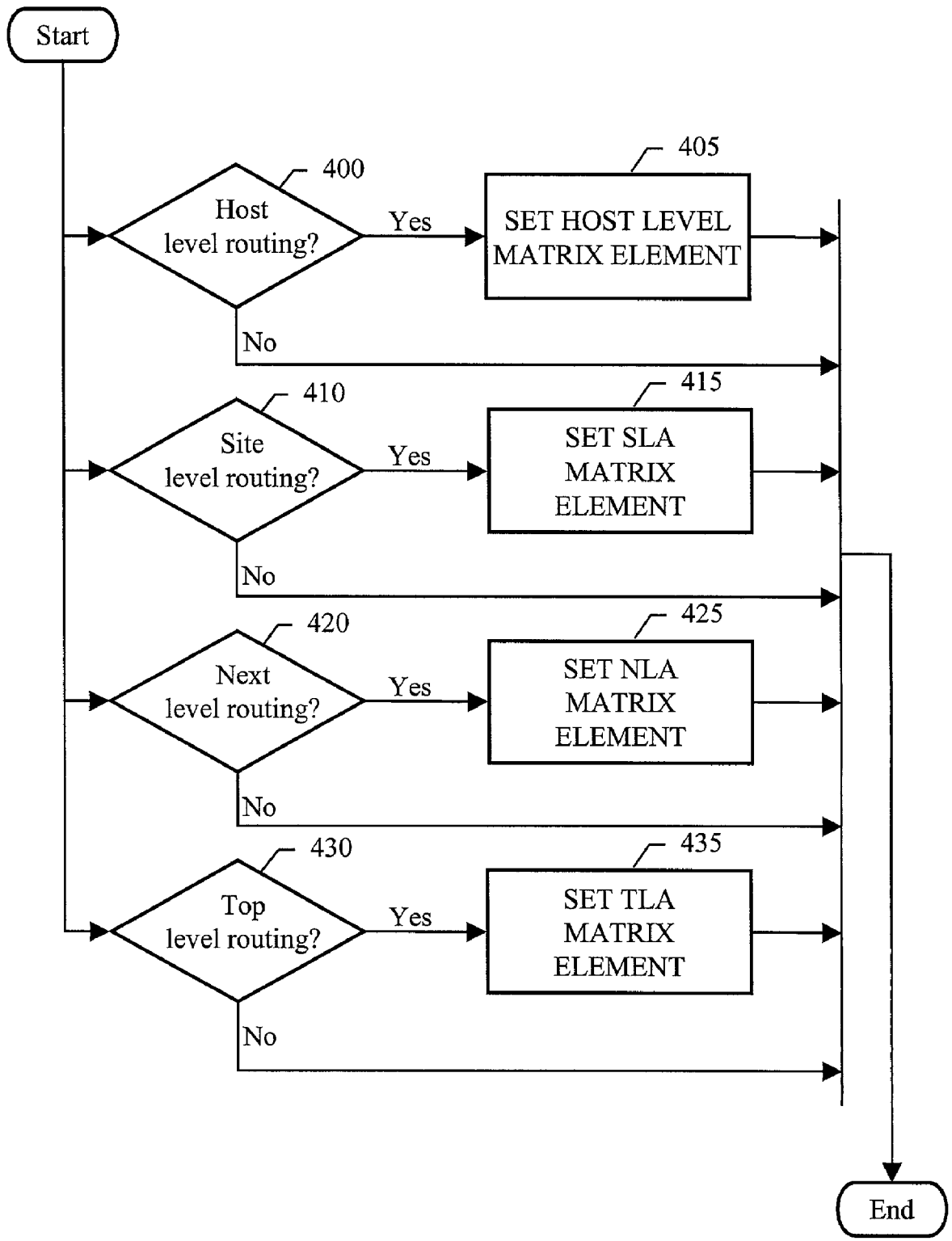
FIG. 4B is a flow chart illustrating a parallel processing example of the method of FIG. 4A for building a routing matrix in an IP router.

Performance advantages may be obtained when the method of FIG. 4A is performed using parallel processing. For example, FIG. 4B is a flow chart illustrating a parallel processing example of the method of FIG. 4A for building a routing matrix in an IP router. The method 400-435 in FIG. 4B is essentially the same as the method in FIG. 4A, except that each level of routing is checked in parallel.

The parallel processing shown in FIG. 4B may be implemented in a communication system employing a hardware-based multithreaded processor, such as that discussed further below in connection with FIG. 8. Additionally, the parallel processing shown in FIG. 4B may be combined with parallel processing of the route identification operations, such as those discussed further below in connection with FIGS. 6, 7A and 7B.

Figure 5:
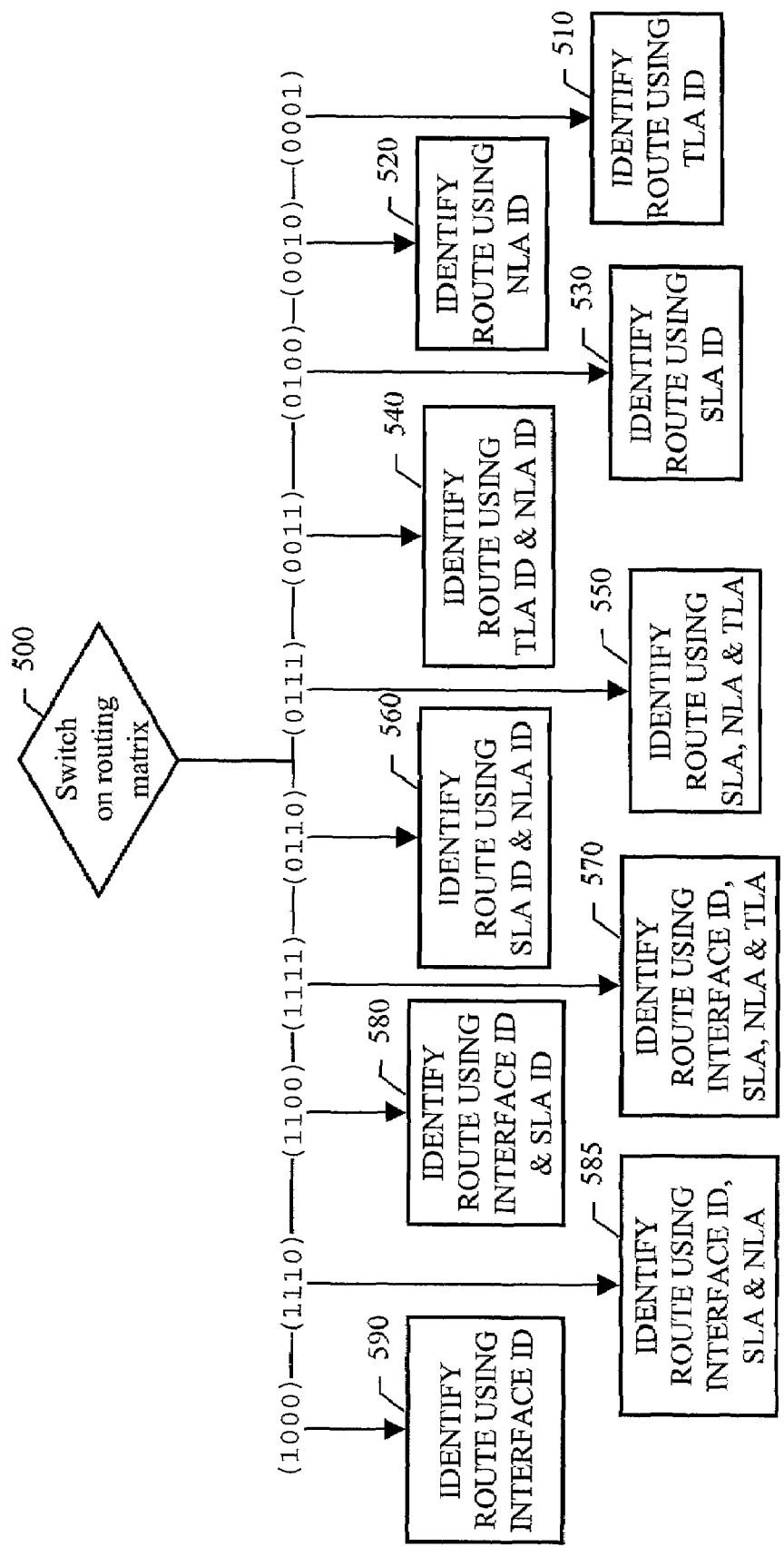
FIG. 5 is a flow chart illustrating a method of determining a set of route identification operations to be performed based on a routing matrix for an IP destination address.

FIG. 5 is a flow chart illustrating a method of determining a set of route identification operations to be performed based on a routing matrix for an IP destination address. The method begins by switching process flow based on the contents of the routing matrix (500). This switching of process flow may represent a series of if-then-else instructions, and may involve checking of individual bit positions in the routing matrix and/or checking of values represented by the routing matrix. When the routing matrix is a binary number, the following cases may result.

If the routing matrix is (0001), a next-hop route is identified using the TLA ID (510). For example, the 13 bits of the TLA ID may be used to perform a single direct lookup into a table of next-hop routes. This may result in a total time for identifying the next-hop route governed by the time needed to perform two RAM read accesses.

If the routing matrix is (0010), a next-hop route is identified using the NLA ID (520). For example, the 24 bits of the NLA ID may be used to access a set of tables using a longest-prefix-match method (e.g., each table in the set of tables may have sixteen entries, and the lookup may be performed four bits at a time, resulting in a maximum of six tables to match a full NLA ID). This may result in a total time for identifying the next-hop route governed by the time needed to perform seven RAM read accesses.

If the routing matrix is (0100), a next-hop route is identified using the SLA ID (530). For example, the 16 bits of the SLA ID may be used to access another set of tables using the longest-prefix-match method as described above (e.g., a maximum of four tables). This may result in a total time for identifying the next-hop route governed by the time needed to perform five RAM read accesses.

If the routing matrix is (0011), a next-hop route is identified using the TLA ID and the NLA ID (540). For example, the 13 bits of the TLA ID may be used to perform a single direct lookup into a table of next-hop routes. The 24 bits of the NLA ID may be used to access a set of tables using a longest-prefix-match method as described above. This may result in a total time for identifying the next-hop route governed by the time needed to perform eight RAM read accesses.

If the routing matrix is (0111), a next-hop route is identified using the SLA ID, the NLA ID and the TLA ID (550). For example, the 13 bits of the TLA ID may be used to perform a single direct lookup into a table of next-hop routes. The 24 bits of the NLA ID may be used to access a set of tables using a longest-prefix-match method as described above. The 16 bits of the SLA ID may be used to access another set of tables using the longest-prefix-match method as described above. This may result in a total time for identifying the next-hop route governed by the time needed to perform twelve RAM read accesses.

If the routing matrix is (0110), a next-hop route is identified using the SLA ID and the NLA ID (560). For example, the 24 bits of the NLA ID and the 16 bits of the SLA ID may be used to access a set of tables using a longest-prefix-match method as described above. This may result in a total time for identifying the next-hop route governed by the time needed to perform eleven RAM read accesses.

If the routing matrix is (1111), a next-hop route is identified using the interface ID, the SLA ID, the NLA ID and the TLA ID (570). For example, the NLA ID, the SLA ID and the TLA ID may be used to perform separate lookup operations as described above. The 64 bits of an interface ID may be hashed together, and resulting 18 bits of hashed data may be taken as an index into a table of next-hop routes. This may result in a total time for identifying the next-hop route governed by the time needed to perform one hash_64_1 instruction, resolve a possible collision, and perform fourteen RAM read accesses.

If the routing matrix is (1100), a next-hop route is identified using the interface ID and the SLA ID (580). For example, the SLA ID and the interface ID may be used to perform separate lookup operations as described above. This may result in a total time for identifying the next-hop route governed by the time needed to perform one hash_64_1 instruction, resolve a possible collision, and perform thirteen RAM read accesses.

If the routing matrix is (1110), a next-hop route is identified using the interface ID, the SLA ID and the NLA ID (585). For example, the SLA ID, the NLA ID and the interface ID may be used to perform separate lookup operations as described above. This may result in a total time for identifying the next-hop route governed by the time needed to perform one hash_64_1 instruction, resolve a possible collision, and perform seven RAM read accesses.

If the routing matrix is (1000), a next-hop route is identified using the interface ID (590). For example, the interface ID may be used to perform lookup operations as described above. This may result in a total time for identifying the next-hop route governed by the time needed to perform one hash_64_1 instruction, resolve a possible collision, and perform two RAM read accesses.

Given the nature of the routing matrix, there are six additional potential combinations that may be considered, but in typical implementations these combinations may not be needed. In general, if an upper level router is involved then routing at lower levels will be performed. Given these potentially unused matrix combinations, checks may be included to ensure these combinations do not occur, or these combinations may be assumed not to occur, and corresponding optimizations in matrix checking may be achieved. Also, alternative implementations may use these additional matrix combinations and/or not use some of the matrix combinations shown in FIG. 5.

The route identification operations discussed above also may be performed using parallel processing, may be combined with the routing matrix production of FIG. 4A, and may be implemented in a communication system employing a hardware-based multithreaded processor, such as that discussed further below in connection with FIG. 8.

Figure 6:
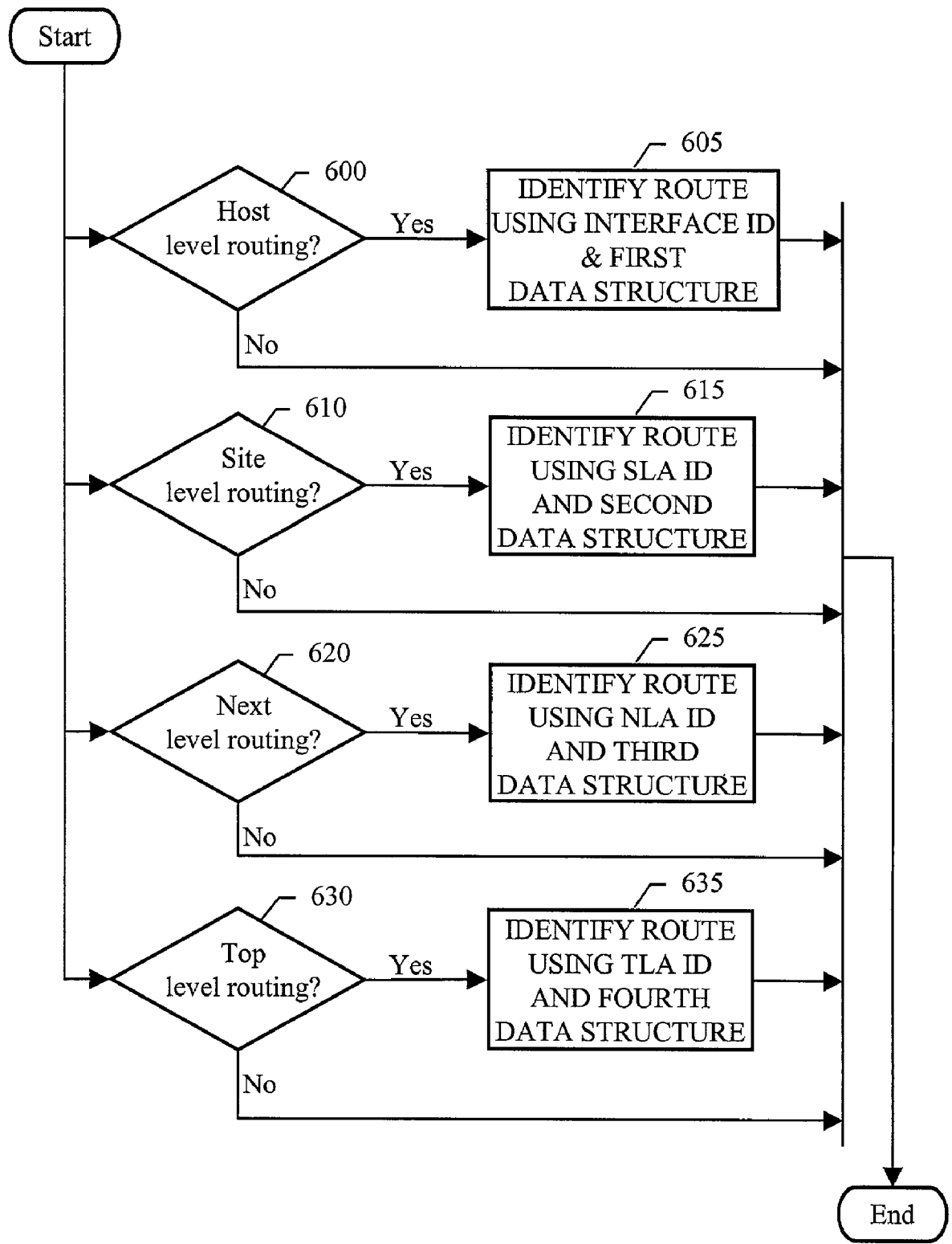
FIG. 6 is a flow chart illustrating a parallel processing example of route identification.

FIG. 6 is a flow chart illustrating a parallel processing example of route identification. The method begins by splitting into separate processing threads that check for each type of routing. For example, four separate process threads may be initiated. A first thread checks for host-level routing (600). If host-level is to be performed, a route is identified using the interface ID and a first data structure (605).

A second process thread checks for site-level routing (610). If site-level routing is to be performed, a route is identified using the SLA ID and a second data structure (615). A third process thread checks for next-level routing (620). If next-level routing is to be performed, a route is identified using the NLA ID and a third data structure (625). A fourth process thread checks for top-level routing (630). If top-level routing is to be performed, a route is identified using the TLA ID and a fourth data structure (635).

These data structures may be completely separate data structures, and host-level routing need not be implemented. For example, if a received packet is to routed based on both a TLA ID and an NLA ID, three sets of operations may be performed in parallel. The first set of operations may include checking the SLA ID and determining that site-level routing is not to be performed. The second set of operations may include checking the NLA ID, determining that next-level routing is to be performed and performing a longest-prefix-match lookup using the NLA ID and a data structure. The third set of operations may include checking the TLA ID, determining that top-level routing is to be performed and performing a direct lookup using the TLA ID and a separate data structure. Moreover, two or more of the first, second, third and fourth data structures may be similar in structure and/or may be part of a larger data structure.

Generally, when initiating parallel processing, the first level to be initiated will depend on the type of router and its network context. For example, in most routers on the Internet, the site-level routing check would be initiated first because in the total population of routers, site-level routing will be used most frequently. However, if host-level routing is supported, initiating the host-level routing check first may be desirable.

In addition, performance advantages may be obtained by using more processing threads than routing identifiers and/or by comparing the source and destination addresses in parallel in blocks smaller than a length of a shortest of the routing identifiers. For example, in a communication system employing a hardware-based multithreaded processor, a routing matrix may be built by comparing a source address and a destination address in blocks of four bits as follows.

FIG. 7A is a block diagram illustrating portions of example source and destination aggregatable global unicast addresses for an IP packet. A destination address 710 includes an FP 712, a TLA ID 714, an NLA ID 716, an SLA ID 718, and a reserved field 720. A source address 700 includes corresponding sections (the interface ID portions of the addresses 700, 710 are not shown).

The destination address 710 may be processed in parallel using eight hardware threads (or contexts) to perform EXCLUSIVE OR operations to build a routing matrix. The routing matrix includes three bits, initialized to zero, representing SLA, NLA and TLA routing. Each hardware thread is assigned a nibble from each of the source and destination addresses 700, 710 to process. The first eight assignments make up a first set 730, which includes all of the SLA ID 718, a portion of the NLA ID 716 and a portion of the TLA ID 714.

Each hardware thread processes its assignment as shown in FIG. 7B, which is a flow chart illustrating a method for building a routing matrix using an EXCLUSIVE OR operation. The method begins by performing an EXCLUSIVE OR operation on source bits and destination bits to produce an address comparison result (750).

Then, a check is made for any non-zero values in relevant bit position(s) of the address comparison result (752). Each bit may be checked individually, or groups of bits may be checked together. For example, in the first set 730, each thread will only examine bits from a particular routing identifier (either SLA, NLA or TLA), and thus each thread may check its complete address comparison result at once. If a non-zero value is identified, the corresponding matrix entry is set to indicate that routing is to be performed based on that routing identifier (754).

As each thread completes its assignment from the first set 730, the thread may be assigned a new nibble-processing task from a second set 732. The second set 732 includes the remaining portions of the NLA ID 716 and the TLA ID 714. The results of processing the first set 730 may be used in later assignments.

For example, for the source and destination addresses shown, TLA ID routing is to be used. This is identified as soon as the first set 730 has been fully processed, and thus a portion 734 of the second set 732 need not be processed. In this case, one of the threads may be assigned the task of looking up a next-hop route using the TLA ID while other threads are still checking the remainder of the NLA ID to determine if NLA routing is to be used. This processing shortcut may result in additional performance improvements.

Figure 8:
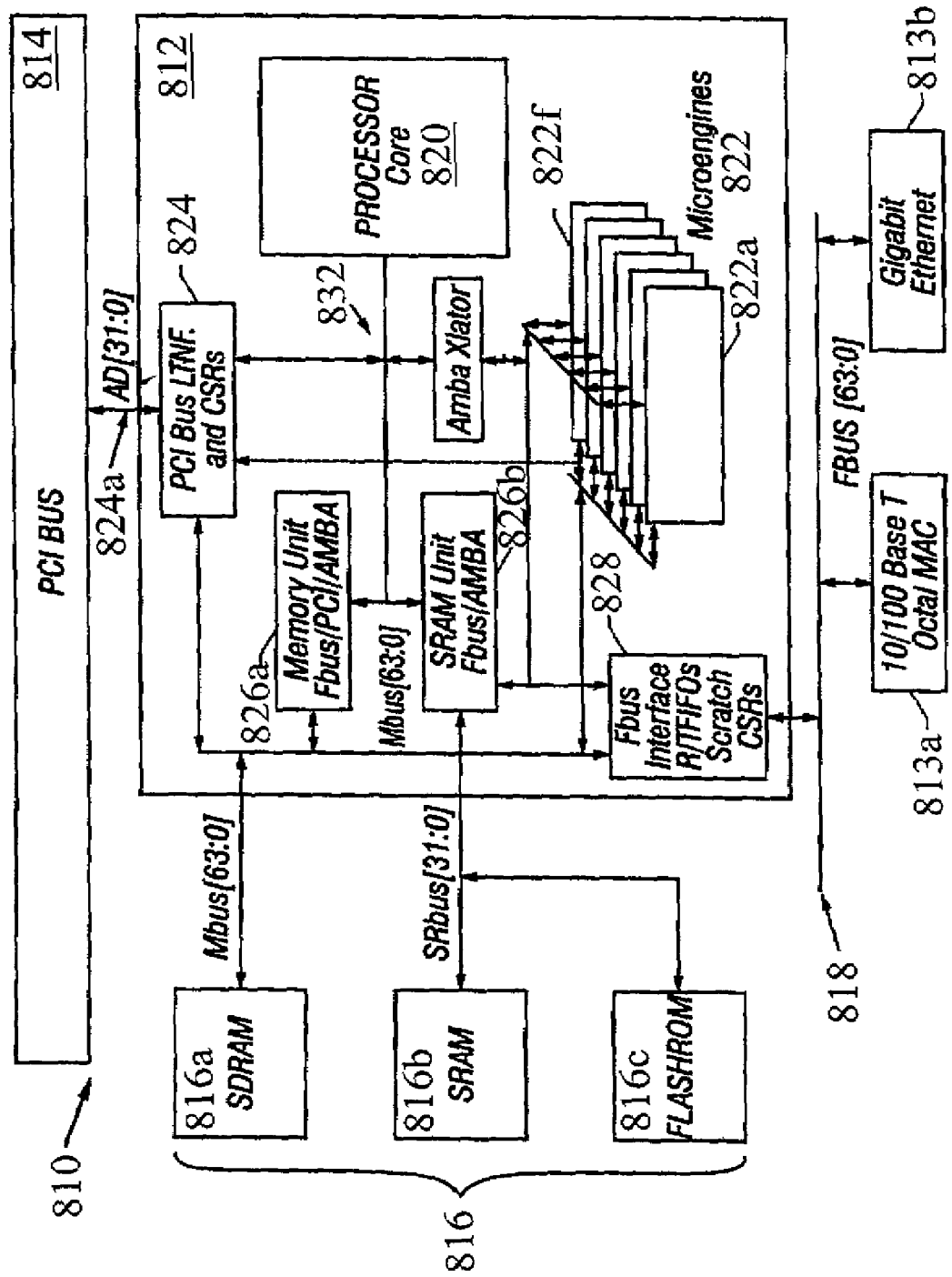
FIG. 8 is a block diagram of a communication system employing a hardware-based multithreaded processor.

FIG. 8 is a block diagram of a communication system employing a hardware-based multithreaded processor. A communication system 810 includes a parallel, hardware-based multithreaded processor 812. The hardware-based multithreaded processor 812 may be coupled with a bus 814 (e.g., a Peripheral Component Interconnect (PCI) bus), a memory system 816 and a second bus 818. The system 810 may be especially useful for tasks that can be broken into parallel subtasks or functions (e.g., tasks that are bandwidth oriented rather than latency oriented).

The hardware-based multithreaded processor 812 has multiple microengines or programming engines 822, each with multiple hardware controlled threads that are simultaneously active and independently work on a task. The hardware-based multithreaded processor 812 also includes a processor core 820 for loading microcode for controlling other resources of the hardware-based multithreaded processor 812. The processor core 820 may perform other general purpose computer type functions such as handling protocols, exceptions, and extra support for packet processing where the programming engines 822 pass the packets off for more detailed processing, such as in boundary conditions.

The processor core 820 may be a Strong Arm™ (Arm is a trademark of ARM Limited, United Kingdom) based architecture. The general-purpose microprocessor 820 has an operating system through which the processor core 820 can call functions to operate on programming engines 822. The processor core 820 may use any supported operating system, but preferably a real time operating system. For the core processor implemented as a Strong Arm™ architecture, operating systems such as Microsoft NT real-time, VXWorks and μCUS, a freeware operating system available over the Internet, may be used.

The hardware-based multithreaded processor 812 also includes functional programming engines 822. Functional programming engines (programming engines) 822 each maintain program counters in hardware and states associated with the program counters. Effectively, corresponding sets of context or threads can be simultaneously active on each of the programming engines 822 while only one is actually operating at any one time.

There may be six programming engines 822a-822f. Each programming engine 822a-822f may have capabilities for processing eight hardware threads or contexts. The six programming engines 822a-822f operate with shared resources including memory system 816 and bus interfaces 824 and 828. The memory system 816 may include a Synchronous Dynamic Random Access Memory (SDRAM) 816a, a Static Random Access Memory (SRAM) 816b, a FLASH Read Only Memory (ROM) 816c, an SDRAM controller 826a and an SRAM controller 826b. SDRAM memory 816a and SDRAM controller 826a are typically used for processing large volumes of data, e.g., processing of network payloads from network packets. The SRAM controller 826b and SRAM memory 816b are used in a networking implementation for low latency, fast access tasks, e.g., accessing look-up tables, memory for the core processor 820, and so forth.

The six programming engines 822a-822f access either the SDRAM 816a or SRAM 816b based on characteristics of the data. Thus, low latency, low bandwidth data is stored in and fetched from SRAM 816a, whereas higher bandwidth data for which latency is not as important, is stored in and fetched from SDRAM 816b. The programming engines 822a-822f can execute memory reference instructions to either the SDRAM controller 826a or SRAM controller 816b.

Advantages of hardware multithreading can be explained by SRAM or SDRAM memory accesses. As an example, an SRAM access requested by a Thread_0, from a programming engine will cause the SRAM controller 826b to initiate an access to the SRAM memory 816b. The SRAM controller 826b controls arbitration for the SRAM bus, accesses the SRAM 816b, fetches the data from the SRAM 816b, and returns data to a requesting programming engine. During an SRAM access, if the programming engine, e.g., 822a had only a single thread that could operate, that programming engine would be dormant until data was returned from the SRAM.

By employing hardware context swapping within each of the programming engines 822a-822f, the hardware context swapping enables other contexts with unique program counters to execute in that same programming engine. Thus, another thread e.g., Thread_1 can function while the first thread, e.g., Thread_0, is awaiting the read data to return. During execution, Thread_1 may access the SDRAM memory 816a. While Thread_1 operates on the SDRAM unit, and Thread_0 is operating on the SRAM unit, a new thread, e.g., Thread_2 can now operate in the programming engine 822a. Thread_2 can operate for a certain amount of time until it needs to access memory or perform some other long latency operation, such as making an access to a bus interface. Therefore, simultaneously, the processor 812 can have a bus operation, SRAM operation and SDRAM operation all being completed or operated upon by one programming engine 822a and have one more thread available to process more work in the data path.

The hardware context swapping also synchronizes completion of tasks. For example, two threads could hit the same shared resource e.g., SRAM. Each one of these separate functional units, e.g., the FBUS interface 828, the SRAM controller 826a, and the SDRAM controller 826b, when they complete a requested task from one of the programming engine thread contexts reports back a flag signaling completion of an operation. When the programming engine receives the flag, the programming engine can determine which thread to turn on.

One example of an application for the hardware-based multithreaded processor 812 is as a network processor. As a network processor, the hardware-based multithreaded processor 812 interfaces to network devices such as a Media Access Controller (MAC) device e.g., a 10/100BaseT Octal MAC 813a or a Gigabit Ethernet device 813b. In general, as a network processor, the hardware-based multithreaded processor 812 can interface to any type of communication device or interface that receives/sends large amounts of data. Communication system 810 functioning in a networking application could receive network packets from the devices 813a, 813b and process those packets in a parallel manner. With the hardware-based multithreaded processor 812, each network packet can be independently processed.

The processor 812 includes a bus interface 828 that couples the processor to the second bus 818. Bus interface 828 may couple the processor 812 to an FBUS 818 (FIFO (first-in-first-out) bus). The FBUS interface 828 is responsible for controlling and interfacing the processor 812 to the FBUS 818. The FBUS 818 may be a 64-bit wide, a 128-bit wide or a 256-bit wide FIFO bus, used to interface to MAC devices.

The processor 812 includes a second interface e.g., a PCI bus interface 824 that couples other system components that reside on the PCI bus 814 to the processor 812. The PCI bus interface 824 provides a high-speed data path 824a to memory 816, e.g., the SDRAM memory 816a. Through that path data can be moved quickly from the SDRAM 816a through the PCI bus 814, via Direct Memory Access (DMA) transfers.

Each of the programming engines 822a-822f may include an arbiter that examines flags to determine the available threads to be operated upon. Any thread from any of the programming engines 822a-822f can access the SDRAM controller 826a, SDRAM controller 826b or FBUS interface 828.

Data functions are distributed amongst the programming engines. Connectivity to the SRAM 26a, SDRAM 826b and FBUS 828 is via command requests. A command request can be a memory request or a FBUS request. For example, a command request can move data from a register located in a programming engine 822a to a shared resource, e.g., an SDRAM location, SRAM location, flash memory or some MAC address. The commands are sent out to each of the functional units and the shared resources. However, the shared resources do not need to maintain local buffering of the data. Rather, the shared resources access distributed data located inside of the programming engines 822a-822f. This enables programming engines 822a-822f, to have local access to data rather than arbitrating for access on a bus and risk contention for the bus. With this feature, there is a 0 cycle stall for waiting for data internal to the programming engines 822a-822f.

Various implementations of the systems and techniques described here may be realized in digital electronic circuitry, in computer hardware, firmware, software, or combinations thereof. For example, the systems and techniques may be implemented in IXP 1200 network processor, provided by Intel Corporation of San Clara, Calif.

The logic flows depicted in the figures do not require the particular order shown and described. As discussed above, in certain implementations, multi-tasking and parallel processing may be preferable.

Other embodiments may be within the scope of the following claims.

What is claimed is:

1. A computer-implemented method comprising:
   receiving a routing address comprising at least two routing identifiers, wherein the routing address comprises a destination address; and
   building a routing matrix to use in determining route identification operations to be performed, the routing matrix identifying one or more of the at least two routing identifiers that are to be used in routing, wherein building the routing matrix comprises comparing the destination address with a source address to identify a difference.

2. The method of claim 1, wherein comparing the destination address comprises:
   performing an EXCLUSIVE OR operation of the destination address and the source address to produce an address comparison result; and
   checking whether the address comparison result includes one or more non-zero values.

3. The method of claim 2, wherein comparing the destination address comprises using parallel processing to compare the destination address with the source address.

4. The method of claim 3, wherein comparing the destination address comprises using blocks smaller than a length of a shortest of the two or more routing identifiers.

5. The method of claim 4, wherein the blocks comprise four-bit blocks.

6. The method of claim 1, wherein building the routing matrix comprises using parallel processing to build the routing matrix.

7. The method of claim 6, further comprising determining a set of route identification operations to perform based on the routing matrix.

8. The method of claim 7, wherein the routing matrix consists of a binary number.

9. The method of claim 7, wherein route identification operations include a direct lookup operation, a longest-prefix-match lookup operation, and a hash table lookup operation.

10. The method of claim 9, wherein the at least two routing identifiers conform to an addressing architecture defined by an Internet Engineering Task Force.

11. A computer-readable medium embodying information indicative of instructions for causing a computer to perform operations comprising:
    receiving a source address and a destination address, each comprising at least two routing identifiers;
    performing an EXCLUSIVE OR operation of the source address routing identifiers with the destination address routing identifiers to produce an address comparison result; and
    determining a set of route identification operations to perform based upon one or more non-zero values in the address comparison result, wherein a different route identification operation is to be used for each of the one or more non-zero values.

12. The computer-readable medium of claim 11, wherein the set of route identification operations comprise one or more of a direct lookup operation and a longest-prefix-match lookup operation.

13. The computer-readable medium of claim 12, wherein performing the EXCLUSIVE OR operation comprises performing an EXCLUSIVE OR operation using blocks smaller than a length of a shortest of the destination address routing identifiers and the source address routing identifiers.

14. The computer-readable medium of claim 13, wherein the blocks comprise four-bit blocks.

15. The computer-readable medium of claim 14, wherein the destination address routing identifiers and the source address routing identifiers conform to an addressing architecture defined by an Internet Engineering Task Force.

16. A system comprising:
    a processor;
    a network device;
    a first bus coupled with the network device and with the processor;
    a memory system embodying information indicative of instructions to cause the processor to perform operations comprising receiving a source address and a destination address, each comprising at least two routing identifiers, and determining a set of route identification operations to perform based upon one or more differences between the source address routing identifiers and the destination address routing identifiers; and
    a second bus coupled with the memory system and with the processor.

17. The system of claim 16, wherein the processor comprises a parallel, hardware-based multithreaded processor.

18. The system of claim 17, wherein the network device comprises a media access controller device.

19. The system of claim 18, wherein the first bus comprises a 128-bit wide first-in-first-out bus.

20. The system of claim 17, wherein the set of route identification operations comprise one or more of a longest-prefix-match lookup operation and one or more direct lookup operations.

21. The system of claim 20, wherein the memory system comprises a dynamic random access memory and a static random access memory.

22. The system of claim 21, wherein the second bus comprises a peripheral component interconnect bus.

23. A communication system comprising:
    a processor;
    means for receiving a source address and a destination address, each comprising at least two routing identifiers;
    means for using the processor to identify one or more differences between the source address routing identifiers and the destination address routing identifiers;
    means for determining a set of route identification operations based upon the one or more differences, wherein a different route identification operation is determined for each of the one or more differences; and
    means for routing data based upon the set of route identification operations.

24. The system of claim 23, wherein the processor comprises a parallel, hardware-based multithreaded processor.

* * * * *